Figure 1:
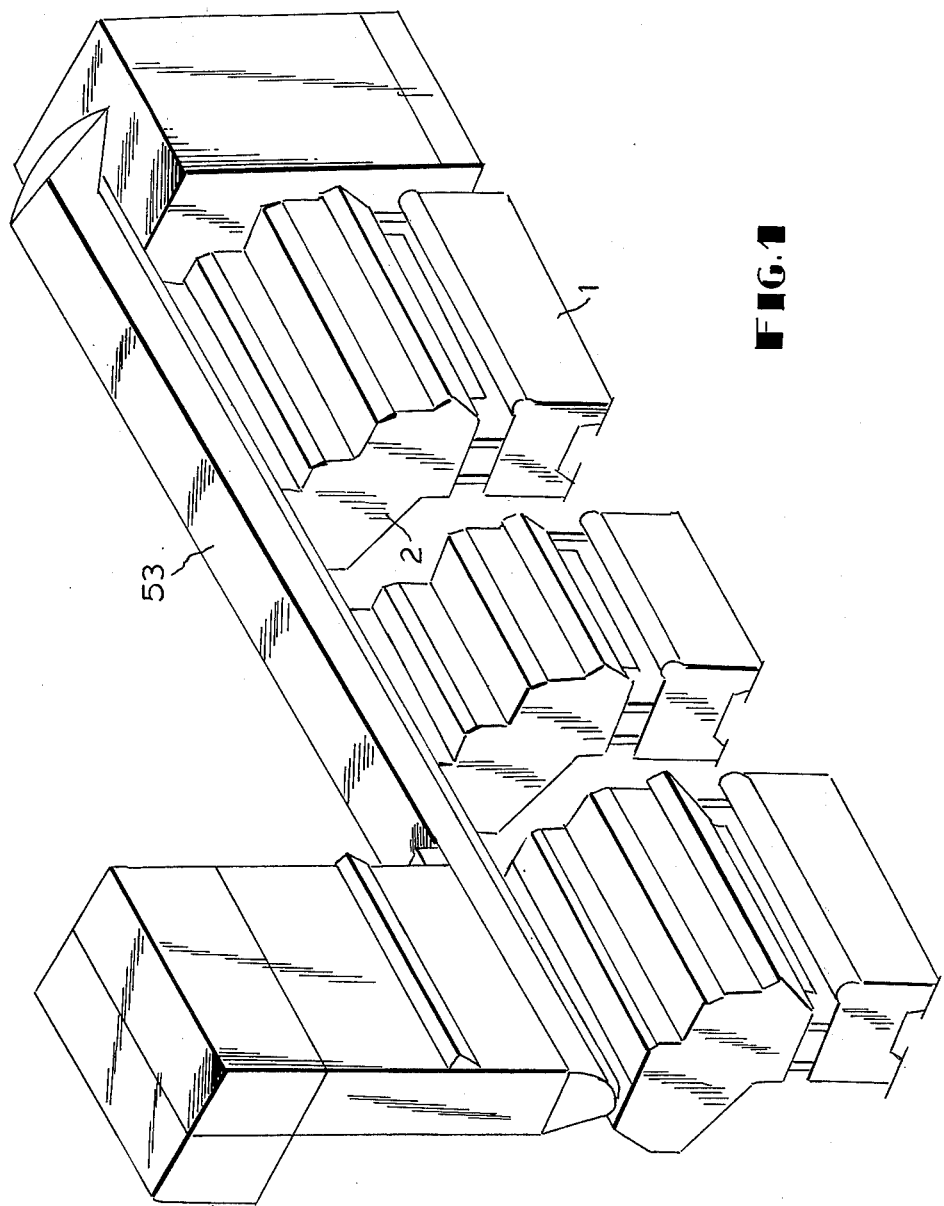

United States Patent [19]

Harrell et al.

[11] 3,963,111

[45] June 15, 1976

[54] FULL FLOW FEEDER

[75] Inventors: Edsel A. Harrell, Tifton, Ga.; Zolon M. Looney; Oliver L. McCaskill, both of Leland, Miss.

[73] Assignee: The United States of America as represented by the Secretary of Agriculture, Washington, D.C.

[22] Filed: Mar. 12, 1975

[21] Appl. No.: 557,844

[52] U.S. Cl. .................................. 198/37; 19/64.5; 19/105; 198/53 R
[51] Int. Cl.² ........................................ B65G 43/08
[58] Field of Search ................ 198/37, 64, 53 R, 69; 222/64, 65; 19/64.5, 105; 214/17 D

[56] References Cited
UNITED STATES PATENTS
2,381,505  8/1945  Lindholm .......................... 198/37 X
FOREIGN PATENTS OR APPLICATIONS
1,576,207  7/1969  France ................................. 198/33

Primary Examiner—Evon C. Blunk
Assistant Examiner—Douglas D. Watts
Attorney, Agent, or Firm—M. Howard Silverstein; Salvador J. Cangemi

[57] ABSTRACT

A new apparatus and method for feeding cotton continuously, uniformly, and at a constant rate to individual gin stands in a battery of gin stands is disclosed. The full flow feeder comprises a rectangular chamber with an upper and a lower section. Valves which form part of the chamber sides in the open position close to form two sections when in the closed position, causing the device to operate as a single chamber in the open position and a dual chamber in the closed position. On-off control switches located in the upper and lower sections operate to balance the flow of seedcotton by signaling a system of hydraulic cylinders to open and close the valves.

7 Claims, 3 Drawing Figures

FULL FLOW FEEDER

This invention relates to cotton ginning machinery. More specifically, this invention relates to a new apparatus and method for feeding cotton continuously, uniformally, and constantly to individual gin stands in a battery of gin stands.

In the prior art the literature teaches that there is a great deal of lost time in the ginning process. One such time loss occurs due to the fact that in a cotton gin plant, the cotton is passed through a series of seed cotton cleaners and then deposited in a conveyor for distribution to from one to six individual combinations of cleaner-feeders and gin stands in a battery. Generally a battery consists of three to five gin stands, where the cotton enters the number one gin first, until it is ginning full capacity. The excess then passes to successive stands in the line filling each successive gin stand to capacity before proceeding to feed the next. Thus all the stands are standing idle until the preceding stands reach their full capacity, resulting in a very significant reduction in the out-turn from gin plants. Tests have shown a considerable loss of time and efficiency due to this factor.

Another great time loss is experienced in the time lapsing between bales. Although the ginning process is continuous, the lint is packaged in 500-pound bales by means of a double box, rotating-press. As the lint is separated from the seed, it is deposited in one box of the press and partially tramped. At the end of a bale the press is rotated 180° and the bale is then pressed to the desired density and tied-out while the next bale is being ginned. When ownership of successive bales is different or for some other reason it is necessary not to mix cotton from different bales, it is necessary to gin almost completely the cotton for one bale before the next bale can start through the cleaning process, and thus considerable time is lost between bales.

Furthermore, with the advent of the mechanical harvesters, it has become increasingly important to have a system to gin greater amounts of cotton in shorter periods of time. The feeding system herein described will make possible greater efficiency in existing gin plants, or new plants, by eliminating or greatly reducing lost time between bales and by maintaining the rate of ginning of all gin stands at the highest possible level of capacity.

Therefore, the main objective of the instant invention is to improve the efficiency of the processing of cotton in a ginning operation.

Another object of this invention is to feed cotton equally to each individual gin stand in a battery of gin stands.

A third object of this invention is to feed cotton to a battery of gin stands at a uniform rate.

A fourth object of this invention is to reduce the amount of time necessary to process a bale of cotton.

A fifth object of this invention is to reduce the cost of ginning cotton.

Other objectives and advantages of this invention will further become apparant hereinafter and in the drawings, in which:

FIG. 1 is an isometric schematic view of the front elevation of a three stand gin plant.

Figure 2:
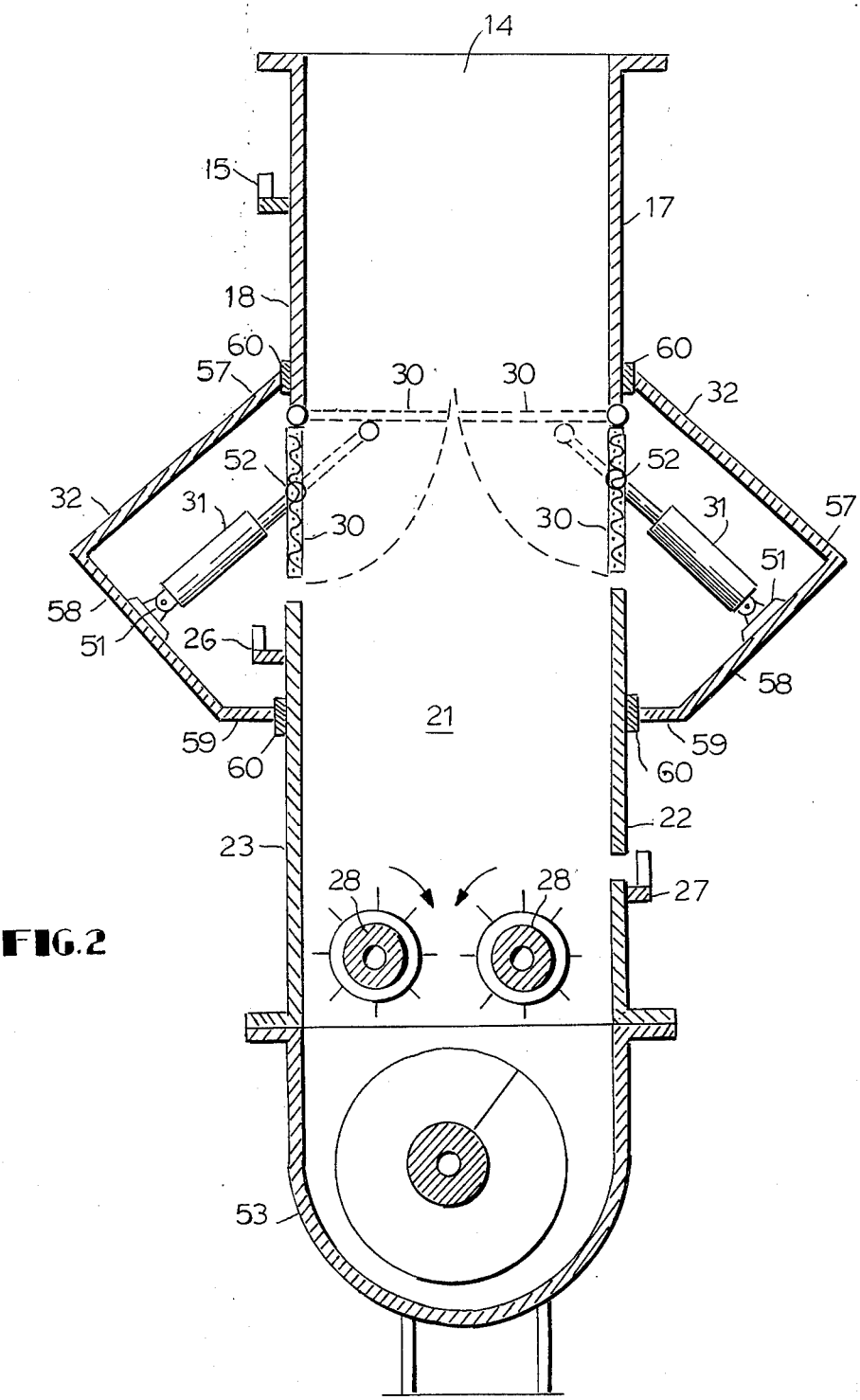

FIG. 2, section A—A is a cross-sectional view of the internal working parts of the full flow feeder.

Figure 3:
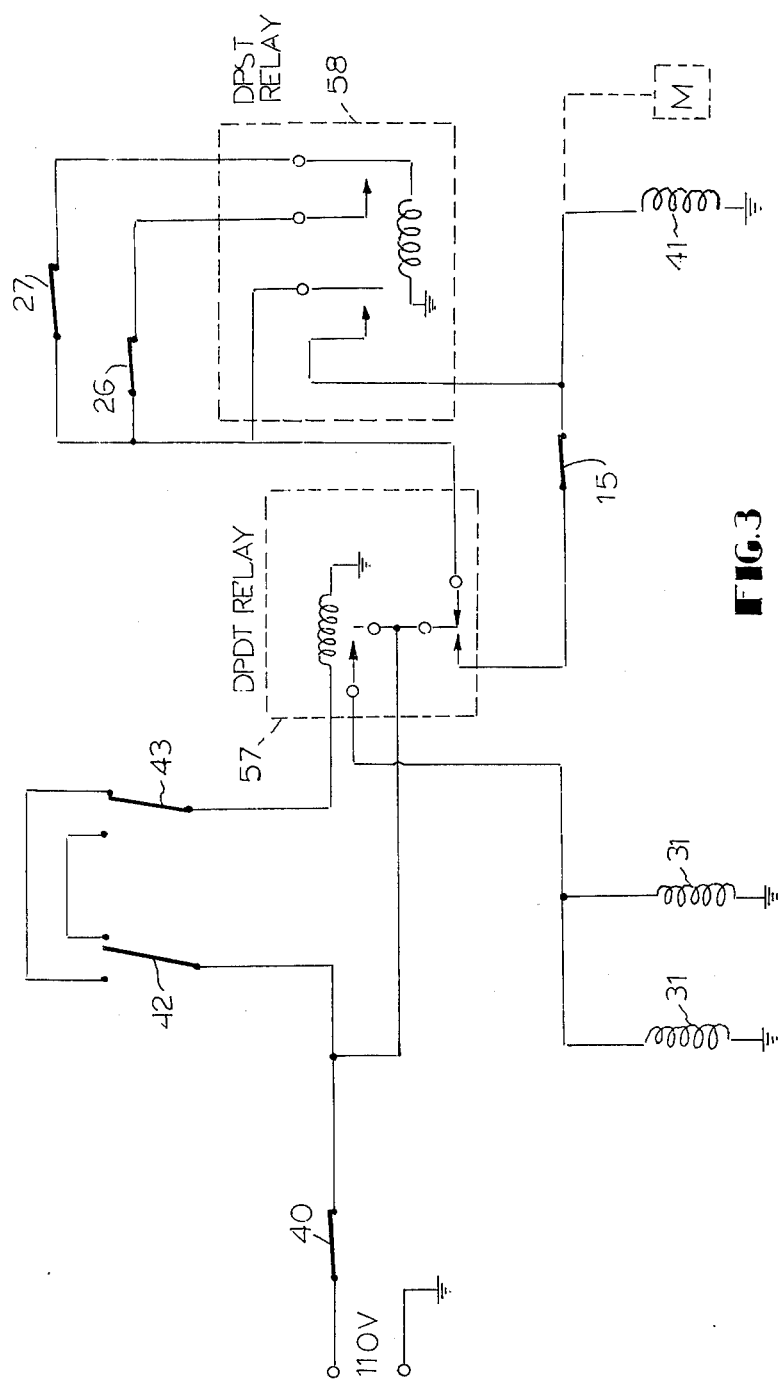

FIG. 3 is an electrical circuit diagram showing the circuit for controlling depth of cotton in the full flow feeder.

In describing the preferred embodiment of the invention illustrated in the drawings, specific terminology will be resorted to for the sake of clarity. However it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, top chamber 14 receives seed cotton (seed cotton will hereinafter be referred to as cotton) from the overhead cleaning and drying equipment. Chamber 14 is composed of four sides 16, 17, 18, 19, forming a rectangular inclosure with each side forming an angle of approximately 90° with the horizontal. Side 19 is not shown on the drawings since it parallels side 16. A side slope of up to 15° from the perpendicular can be tolerated, making the top cross-sectional area of the chamber smaller than the cotton section. Dimensions of the chamber will vary with different installations. Normally, sides 17 and 18 are approximately two and one-half times the width of sides 16 and 19 and width of sides 16 and 19 corresponds to the width of the distributor. The height of sides 16, 17, 18, and 19, should be sufficient to provide capacity in chamber 14 for 250 to 300 pounds of free-falling cotton. The volume of chamber 14 is variable, but is normally around 45 cubic feet. Provisions are made at the top of chamber 14 for letting cotton enter the chamber from a cleaner, separator, blow box, or any other suitable conveying method presently being employed in gins for transferring cotton from one device to another. Side walls 17 or 18 have one standard switch 15 mounted on it for controlling the depth of cotton in chamber 14. When cotton fills chamber 14 to switch 15, then switch 15 will stop the flow of cotton through the drying and cleaning system of the plant. There will be no further cotton flow until the top level of the cotton has been reduced below switch 15. The capacity of the bin above switch 15 must be large enough to accommodate as much seed cotton as is in the cleaning and drying system at any one time. At the lower end of chamber 14 are two valves 30 which are activated by cylinders 21 which open or close valves 30 simultaneously. Upon closing, they form a bottom to chamber 14, thereby holding cotton in this section. The valves are attached to sides 17 and 18 and, thereby, become a part of them when in the proper position, extending in length the full width of each side. Each valve 30 has a hydraulic, or air, cylinder for effecting its opening and closing. Valves 30 are suitably supported by brackets 32. Bracket 32 is composed of component parts 57, 58, 59, and 60. The cylinder is attached to bracket part 58 by a flexible clevis 51, and attached to valve 30 through another flexible joint 52.

Beneath chamber 14 is chamber 21. When valves 30 are opened, chamber 14 and 21 function as one chamber. Chamber 21 has four sides (22, 23, 24, and 25), which are a continuation of the sides 16, 17, 18, and 19 of chamber 14, and are approximately the same width and height. Switches 26 and 27 are located near the top and bottom respectively of chamber 21, either on the same side or on opposite sides. Switch 26 controls the depth of cotton in chamber 21 and functions only when valves 30 are open. Wiring diagram to operate switches 15, 26, 27, and valves 30 is shown in FIG. 3, and is thus explained:

Power from 110-volt A. C. single phase source is supplied through master switch 40. When switch 40 is open and there is no power in the circuit cylinder 31 holds valves 30 open and cylinder 41 stops the flow of seedcotton into the overhead cleaning and conditioning equipment (not shown). When switch 40 is closed and switches 42 and 43 are in position as shown DPDT relay is not energized and therefore cylinders 31 keeps valves 30 open. However, power is supplied to 58 DPST relay through switch 27. This relay becomes active and starts cotton to flow through the system as a result of energy being supplied to cylinder 41 or by switching an electric motor indicated by dotted lines in the diagram. Cotton entering the full flow feeder contacts switch 27 and it opens. Cotton continues to flow as power is now applied to DPST relay through switch 27. When cotton reaches a depth in chamber 21 high enough to contact and open switch 26 the flow of seedcotton stops due to 58 DPST relay being de-energized. Seedcotton cannot flow in the system again until the depth of cotton in chamber 21 is decreased below switch 27 and it closes again. During the ginning of a bale the depth of seedcotton in chamber 21 fluctuates between switches 26 and 27. The flow is stopped by switch 26 and started again by switch 27. All of this time feed rollers 28 are continuously feeding seedcotton into the distributor at a constant rate. When all of the cotton from a bale has reached chamber 21 either switch 42 or 43 is changed. This energizes 57 DPDT relay and de-energizes the 58 DPST relay thereby taking out of the circuit switches 26 and 27. Now with the 57 DPDT relay closed, cylinders 31 close valves 30 which forms a bottom to chamber 14. Seedcotton may continue to flow through the overhead system. Cylinder 41 now receives power through switch 15 located near the top of chamber 14. When chamber 14 is filled, switch 15 opens and stops the flow of seedcotton. No more seedcotton can flow through the system until either switch 42 or 43 is changed. When either switch is changed valves 30 open and switches 26 and 27 again control the flow of seedcotton through the overhead cleaning and conditioning equipment. In this way chamber 14 is filled with seedcotton ready for ginning while the end of a bale may be completed from chamber 21 and the overflow. A flip of a switch and seed cotton cleaned and conditioned is available for immediate ginning.

Along the lower part of chamber 21 are two variable speed rollers 28, which feed the cotton from chamber 21 at a variable and adjustable rate determined by the capacity of the ginning system. Rollers 28 are essentially the same length as the width of sides 22 or 23. The diameter and spacing of rollers 28 are such that when they are not resolving, cotton will not fall past them. Usually the rollers will be approximately 10 inches in diameter. On sides 24 and 25 are bearings to accommodate shafts of each roller. Power is applied to the rollers externally from a motor, or any other suitably adapted source of power. Power is applied to rollers 28 through a variable speed mechanism 53 attached to its shaft.

Having thus described our invention, we claim:

1. An apparatus and method for feeding cotton continuously and uniformally to individual gin stands in a battery of gin stands comprising in combination.
    a. an upper section of a rectangular chamber for receiving process material comprising:
        1. an open ended top through which process material is received,
        2. parallel sides forming an angle of 90° with the horizontal and interrelating with,
    b. a lower section of the same rectangular chamber comprising:
        1. an open bottom for material discharge,
        2. parallel sides which are vertical extensions of the upper rectangular chamber and
        3. two parallel movable valves, pivotably mounted on hinges at the top and located on the two chamber sides with the longer dimension, said valves running substantially the full length of said sides and forming part of the chamber sides when in the open position and forming a bottom for the upper section of the rectangular chamber and concurrently a top for the lower section of the rectangular chamber when in the closed position, substantially forming a single chamber in the open position and two separate chambers in the closed position, thus imposing a positive means of controlling the flow of process materials, and
    a. a means of opening and closing said valves,
    b. a means of energizing the opening and closing mechanism,
    c. a means of supporting the valves and the opening and closing means.
    4. a means of automatically controlling the level of process materials in the chamber,
    5. a means of feeding process material from the chamber at a variable and adjustable rate which is determined by the capacity of the ginning system, and
    a. a means of applying power to the said variable and adjustable feeding means.

2. The apparatus and method defined in claim one wherein the means of opening and closing the valves further comprises:
    a. a hydraulic cylinder attached at the top and to the valve and forming a 45° acute angle with the vertical sides and attached at the lower end to a supporting means so as to form a 90° angle with the base support member.

3. The apparatus and method defined in claim two further comprising:
    a. a clovis installed between the hydraulic cylinder and the lower end and the base member and
    b. a flexible joint installed between the upper end of the hydraulic cylinder and the valve to allow for rotatable alignment.

4. The apparatus and method as defined in claim one wherein the means of energizing the opening and closing mechanism and controlling the level of seedcotton in the lower section of the rectangular chamber comprises:
    a. a standard on-off switch located on the side wall in the upper section of the rectangular chamber for control of the depth of cotton in the upper section of the rectangular chamber by stopping the flow of cotton to the chamber and
    b. two standard on-off switches located either on the same side wall or opposite sides in the lower section of the rectangular chamber, one switch located near the top of the lower section of the rectangular chamber and the other located near the bottom of the lower section of the rectangular chamber, said upper switch controlling depth of seed cotton in the lower section of the rectangular chamber by stopping the flow of seed cotton to the chamber and the lower switch controlling the flow of cotton by signaling continuation of flow of seed cotton to the chamber.

5. The apparatus and method as defined in claim one wherein the means of feeding process material from the chamber at a variable and adjustable rate comprises:
 a. Two parallel variable speed rollers located in the lower section of the rectangular chamber, essentially the same length as the width of the longer dimensioned rectangular chamber sides, said rollers of optimal diameter and spacing such that when not revolving, cotton will not fall past them, and rotatably mounted on opposing shorter dimensioned sides of the rectangular chamber.

6. The apparatus and method defined in claim five wherein the rollers have a shaft on each end rotatably mounted in a bearing attached to the side chamber walls.

7. The apparatus and method defined in claim one wherein the height of the upper section of the rectangular chamber is sufficient to provide a capacity of 250 to 300 pounds of free falling cotton.

* * * * *